(12) United States Patent
Lachmann et al.

(10) Patent No.: US 6,345,635 B2
(45) Date of Patent: Feb. 12, 2002

(54) CONVEYING SYSTEM FOR WORK PIECES

(75) Inventors: Klaus W. Lachmann, Algonquin, IL (US); Antonio Belisario Duran Espinosa; Daniel Guzman Gomez, both of Puebla (MX)

(73) Assignee: Eisenmann Corporation, Crystal Lake, IL (US)

( * ) Notice: Subject to any disclaimer, the term of this patent is extended or adjusted under 35 U.S.C. 154(b) by 0 days.

(21) Appl. No.: 09/784,754

(22) Filed: Feb. 15, 2001

Related U.S. Application Data

(62) Division of application No. 09/307,546, filed on May 7, 1999, now Pat. No. 6,253,907.

(51) Int. Cl.[7] .................................................. B08B 3/04
(52) U.S. Cl. ........................................... 134/76; 134/83
(58) Field of Search ........................... 198/465.4, 468.6, 198/750.14; 134/76, 82, 83; 118/423

(56) References Cited

U.S. PATENT DOCUMENTS

| | | | | |
|---|---|---|---|---|
| 2,789,569 A | * | 4/1957 | Davis ........................ | 134/83 X |
| 2,866,565 A | | 12/1958 | Temple | |
| 3,024,794 A | * | 3/1962 | Chill ........................ | 134/83 X |
| 3,123,197 A | | 3/1964 | Pianowski | |
| 3,381,695 A | * | 5/1968 | Clark ........................ | 134/83 X |
| 3,601,134 A | * | 8/1971 | Benjamin .................. | 134/83 X |
| 3,658,197 A | * | 4/1972 | DiDonato .................. | 134/76 X |
| 4,749,465 A | | 6/1988 | Flint et al. | |
| 4,812,211 A | | 3/1989 | Sakai | |
| 4,942,956 A | | 7/1990 | Acker et al. | |
| 5,012,918 A | | 5/1991 | Acker et al. | |
| 5,439,015 A | * | 8/1995 | Shibano ..................... | 134/83 X |

FOREIGN PATENT DOCUMENTS

| | | | | |
|---|---|---|---|---|
| CH | 400009 | * | 4/1966 | ................ 134/83 |
| JP | WO 8804642 | | 6/1988 | |

* cited by examiner

Primary Examiner—Philip R. Coe
(74) Attorney, Agent, or Firm—Lee, Mann, Smith, McWilliams, Sweeney & Ohlson; Gerald S. Geren

(57) ABSTRACT

A circuit-like system which includes a lower conveyor line, an upper conveyor line and a pair of lift or transfer mechanisms at the end of each line constructed for moving a work piece. A travel and hoist mechanism and a beam assembly are provided for discontinuously moving work pieces along the lower line and raising and lowering them for treatment. A hook assembly is provided for restraining the downward movement of a work piece at a selected location when the hook assembly is in an operative position.

The lift or transfer mechanism is provided which includes telescoping arms for grasping a work piece, which arms are carried by a vertically moveable carrier that is mounted in a stationary frame.

8 Claims, 13 Drawing Sheets

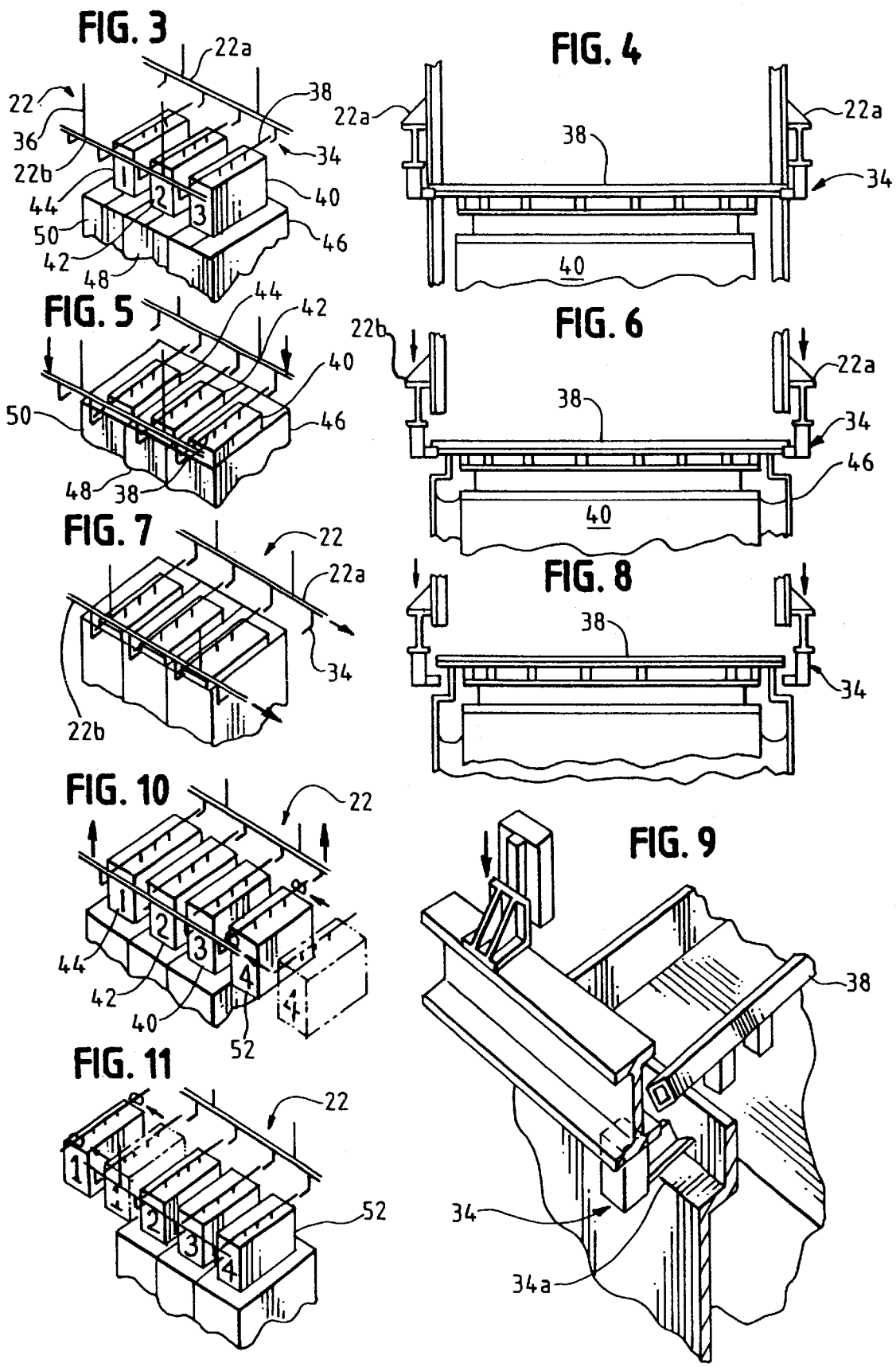

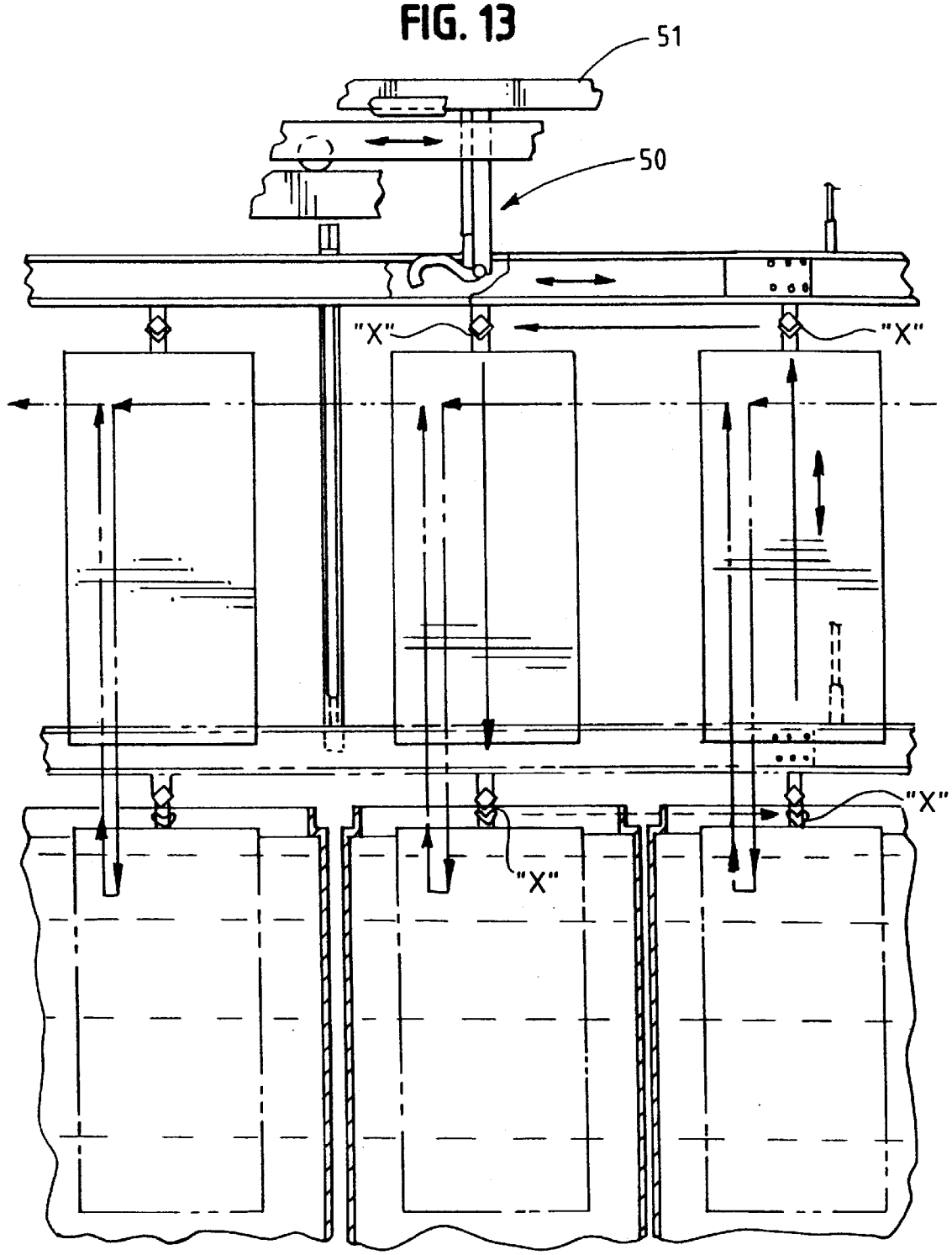

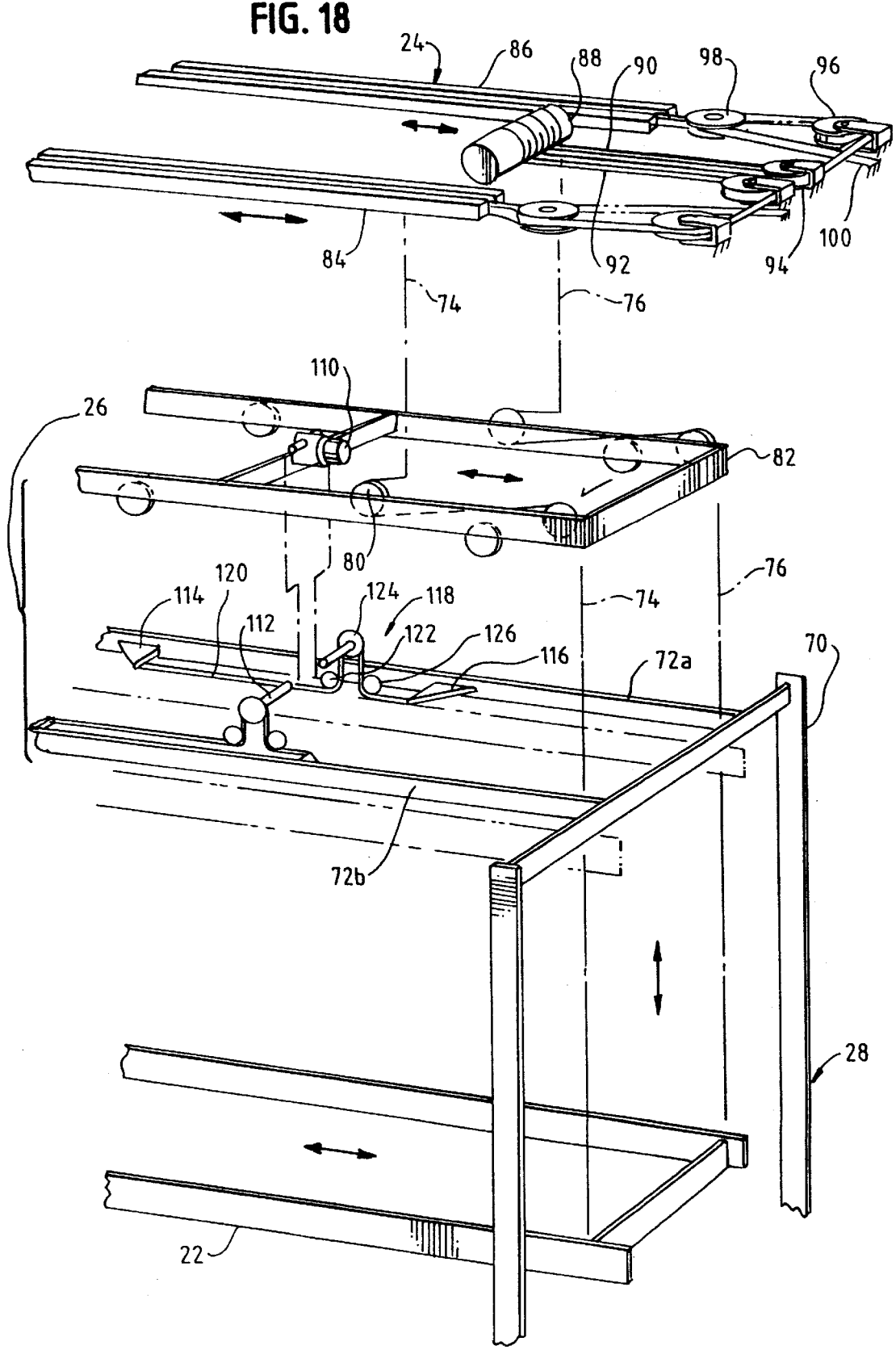

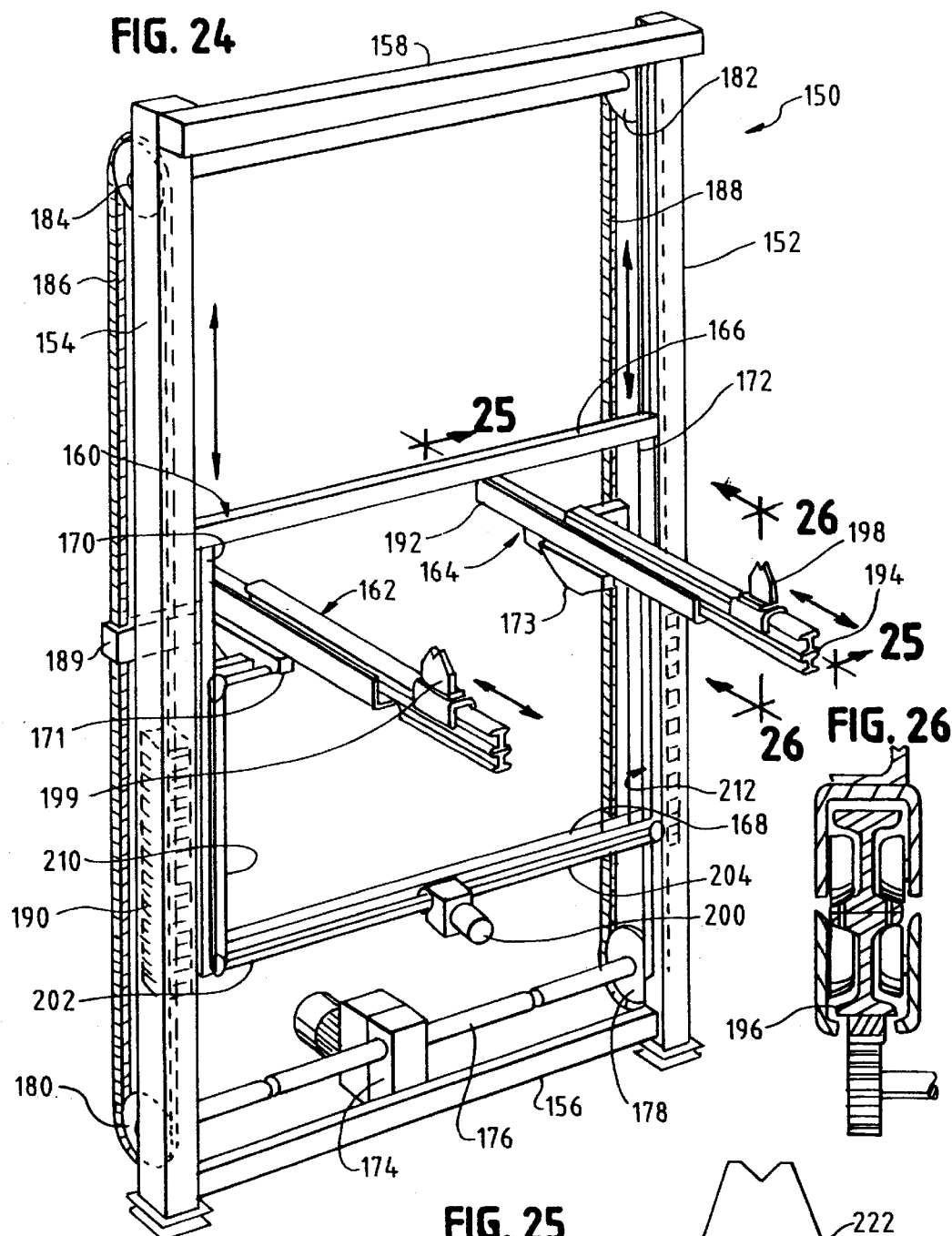
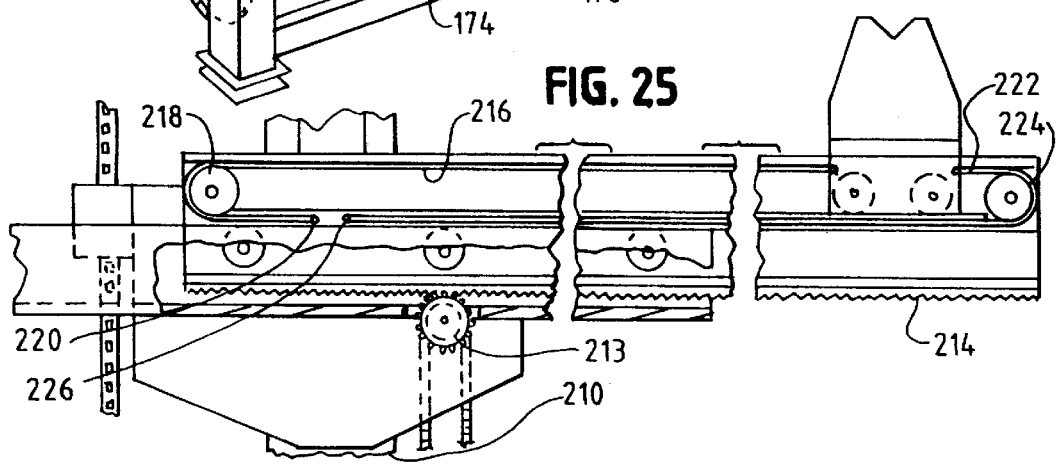

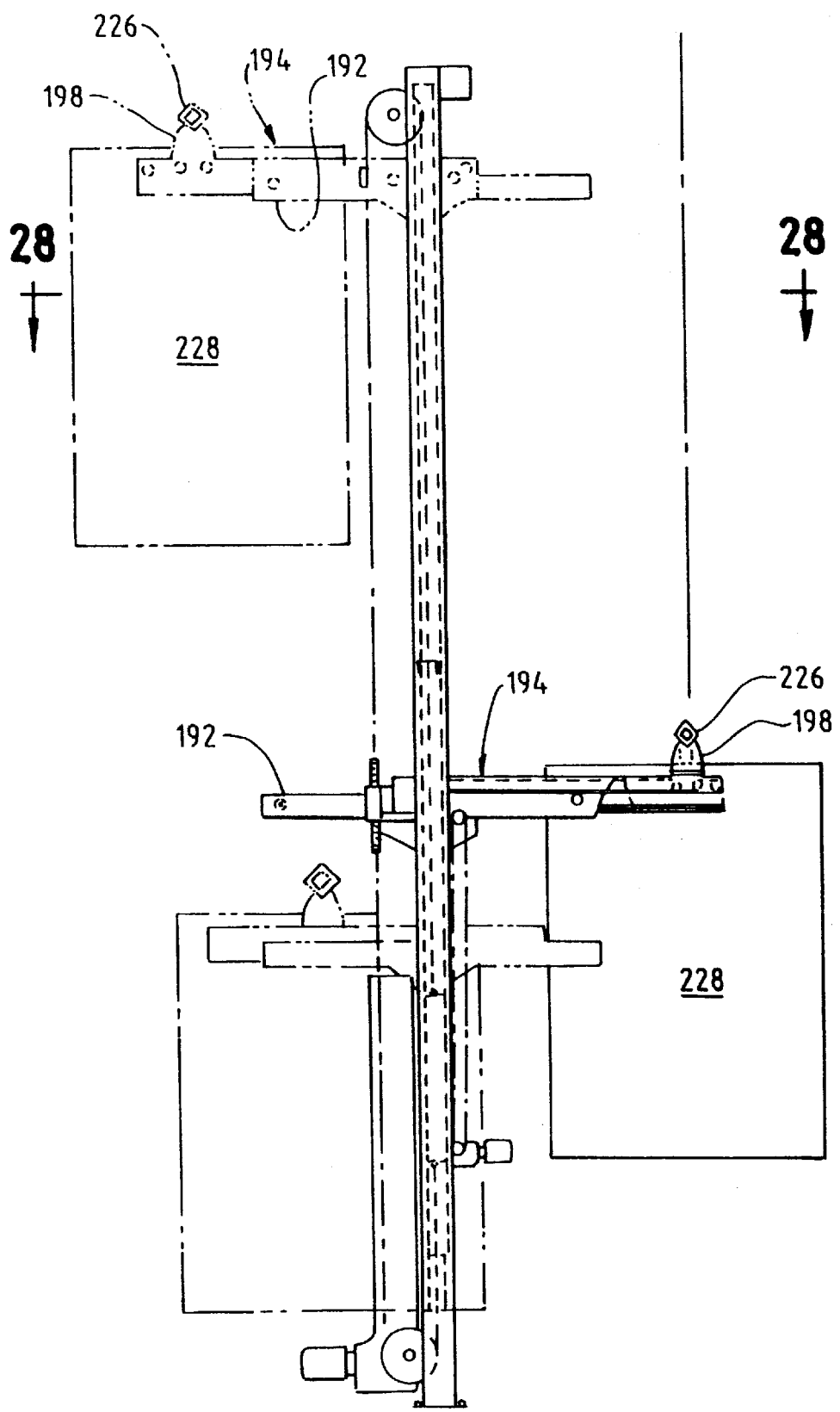

CONVEYING SYSTEM FOR WORK PIECES

This application is a division of application Ser. No. 09/307,546 filed on May 7, 1999, and now U.S. Pat. No. 6,253,907

BACKGROUND OF THE INVENTION

This invention relates to a circuit-like conveying system whereby work pieces are moved to various treatment stations and more particularly to a system for moving the work pieces along a generally horizontal path in a discontinuous manner and vertically as required and to a related transfer or lift mechanism.

Conveyors for moving work pieces from place to place or to treatment stations are well known. One conveyor type moves work pieces from place to place in a continuous manner. Another type of conveyor moves the work pieces in a start/stop or discontinuous manner so that the work pieces can be treated (usually dipped) at various stations. Such treatment may include painting, plating, cleansing and the like. Conveyors of this type move the work piece along a horizontal path, then the work piece may be stopped, moved vertically downwardly at a given station so as to dip the work piece in a treatment tank, upwardly out of the tank and then back along the horizontal path. A transfer or lift mechanism, positioned at the end of the conveyor, is provided for moving the work piece from one path or conveyor line to another. Conveyors of this type may receive untreated pieces from a remote conveyor and deliver treated pieces to the remote conveyor.

In a circuit-like conveying system there is provided a first or lower horizontal conveyor line or path along which the pieces are moved, stopped, lowered, treated, raised and moved to the end of the line. At the end of the line the pieces exit the first horizontal conveyor, are retrieved and moved vertically upwardly or delivered to the entrance to a second or upper horizontal line which may be a drying oven or drying station. The pieces are moved horizontally along a second or drying line (usually in an opposite direction to the first conveyor) to the exit of the second line and may be returned to the remote conveyor and an untreated piece can be retrieved and delivered to the entrance for the first conveyor. This type of movement is seen in connection with plating machines and the like and generally defines a circuit. Machines of this type are known in the prior art but are believed to be complex and unreliable.

It is an object of this invention to provide an improved circuit-like conveying system of the type described above which is less complex and more reliable than machines of the prior art.

Systems of the type described herein include a transfer or lift station at the exit end of the first line for retrieving treated pieces and moving the pieces upwardly for delivery to the entrance to a second conveyor line for drying or the like. A transfer station at the exit end of the second line is provided for removing dried pieces and delivering them to a remote conveyor. The transfer station or lift can also retrieve untreated pieces from the remote conveyor and move or deliver them into the entrance end of the first treatment line. Transfer or lift mechanisms in the prior art tend to be complex, unreliable and not identical at the respective ends of the lines.

It is an object of this invention to provide improved transfer stations or lift mechanisms which are less complex, reliable and substantially identical so that one can be placed at the end of the treatment line or the drying line for the movement of work pieces.

With respect to the first conveyor, the work pieces are substantially equally spaced from one another and are moved downwardly as a group into treatment tanks, treated, moved upwardly as a group and then moved on to the next station for additional treatment.

It is an object of this invention to provide an improved system for moving the work pieces as a group a fixed distance, dipping them into a plurality of tanks for treatment, raising them and moving them on to the next station.

These and other objects of this invention will become apparent from the following description and appended claims.

SUMMARY OF THE INVENTION

There is p provided by this invention an improved circuit-like conveying apparatus for the movement of work pieces between various treatment stations an d a transfer station or a lift mechanism for retrieving work pieces from one conveyor and delivery to a second conveyor. The apparatus includes a frame and a plurality of treatment stations positioned relative to the frame. A travel mechanism carried on the frame is moveable relative to the frame between adjacent treatment stations. A hoist mechanism, which is carried on the travel mechanism, cooperates in moving the work pieces between lower treatment and upper movement positions. A beam, which cooperates with the hoist mechanism, extends along the frame and is connected to the hoist mechanism, preferably by an electrically driven retractable and extendable mechanism, carries or supports the work pieces and is constructed to release work pieces when they are in treatment tanks. By this construction a work piece can be releasably secured to the beam, lowered for treatment, raised and moved horizontally from the entrance to the exit of the lower or treatment line. The work pieces are releasably secured to the beam and are constructed to be released when positioned in a treatment station tank so that the beam can be moved rearwardly one station and then raised so as to grasp a subsequent or trailing work piece and move it forwardly to the next station. In this way the work pieces are moved from tank to tank.

A transfer station or lift apparatus for retrieving a work piece is provided at the exit end of the conveyor or treatment line and is arranged to retrieve a work piece at the exit end and transport the work piece to the entrance end of another conveyor which is horizontally disposed above the first conveyor. The similar transfer apparatus or lift station is provided at the exit end of the upper conveyor for movement of a treated piece to a remote conveyor. The lift apparatus may also retrieve an untreated work piece from the remote conveyor and transport it to the entrance end of the lower treatment conveyor.

In this way an untreated piece can be removed from the remote conveyor, moved to the first or treatment conveyor, then moved to the second or drying conveyor and then retrieved from the drying conveyor and moved to the remote conveyor. As is seen the apparatus provides a circuit-like system for movement of the work pieces as well as subassemblies such as the travel mechanism, hoist mechanism and lift apparatus.

BRIEF DESCRIPTION OF THE DRAWINGS

FIG. 3 is a diagrammatic and perspective view showing work pieces associated with a beam mechanism and positioned for lowering into a plurality of treatment tanks.

FIG. 4 is an end elevational view of a portion of the apparatus as seen in FIG. 2 showing a work piece positioned for lowering into a treatment tank.

FIG. 5 is a view similar to FIG. 3 showing the support beam lowered and work pieces lowered into a plurality of treatment tanks.

FIG. 6 is a view similar to FIG. 4 showing a work piece lowered into a treatment tank.

FIG. 7 is a view similar to FIG. 5 showing the work pieces in the tanks and the rearward movement of the support beam.

FIG. 8 is a view similar to FIG. 6 showing a work piece supported at the top of the tank and the support beam free to move rearwardly.

FIG. 9 is a perspective view of a fragment of the beam, hanger and tank showing the support beam moved downwardly and out of engagement with the hanger mechanism.

FIG. 10 is a perspective similar to FIG. 7 showing the support beam raised and the work pieces raised from the tank and the beam positioned to receive a new work piece.

FIG. 11 is a perspective view similar to FIG. 10 showing the support beam and work piece being moved forwardly so as to index the system forwardly one unit.

FIG. 13 is a side elevational view of a portion of the lower conveyor showing a hook mechanism for preventing the lowering of a work piece.

FIG. 18 is an exploded perspective view showing the support beam and the travel and hoist mechanisms for causing the beam to index one station and for raising and lowering the beam relative to the frame.

FIG. 24 is a perspective view of a lift mechanism whereby work pieces can be retrieved from one conveyor and moved to a second conveyor.

FIG. 25 shows an arm and a saddle mechanism carried by the lift mechanism for engaging, supporting and moving a work piece and is taken along line 25—25 of FIG. 24.

FIG. 26 is an end elevational view taken along line 26—26 of FIG. 24 showing an arm or rail associated with the lift mechanism.

FIG. 27 is a side elevational view of the lift mechanism showing an arm with a work piece in various positions.

DETAILED DESCRIPTION OF THE PREFERRED EMBODIMENT

I. The System Generally

Figure 1:
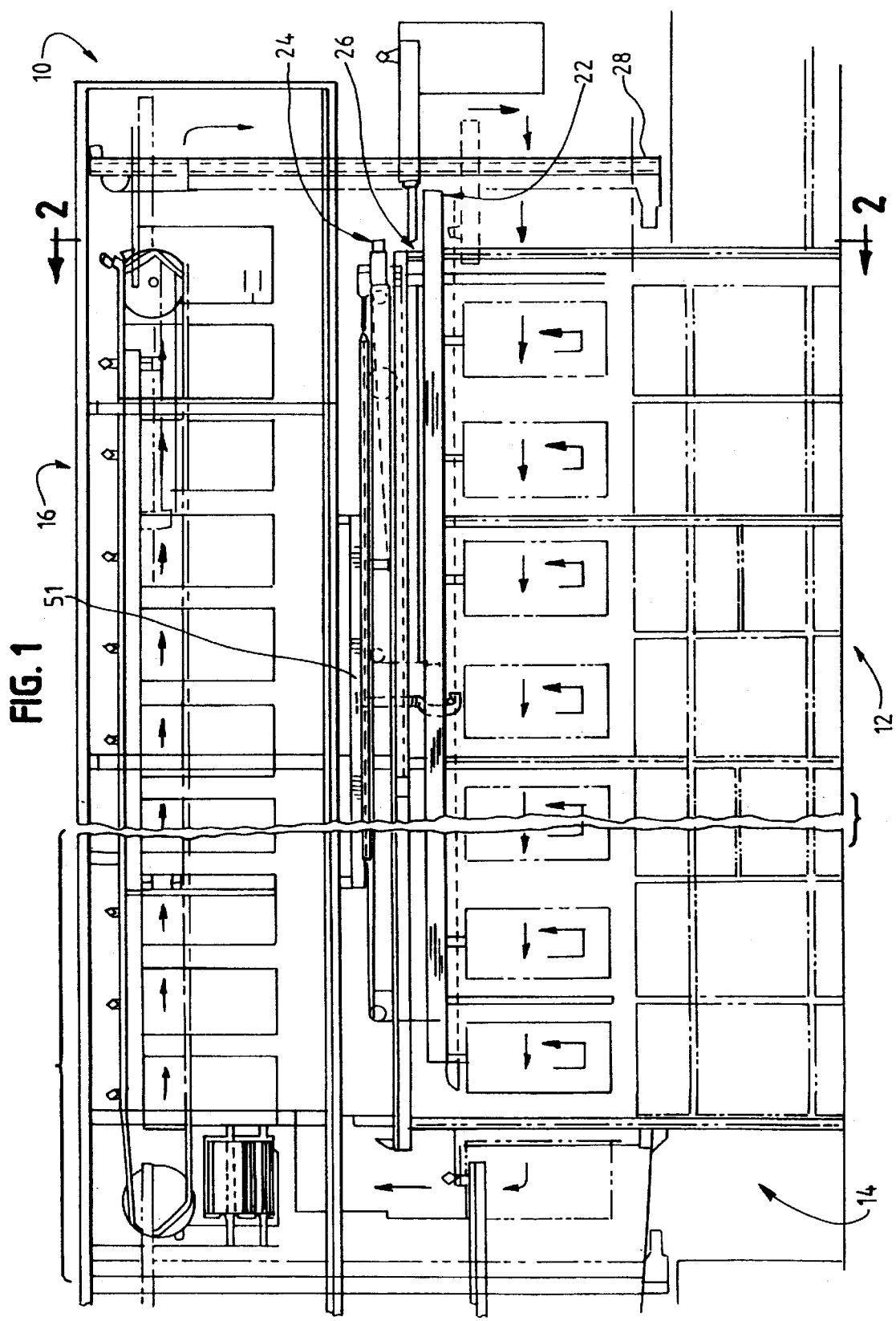
FIG. 1 is a side elevational view showing a circuit-like conveying apparatus which includes a first or lower treatment line, a second or upper drying line, lift mechanisms at the end of the lines and mechanisms for raising, lowering and moving work pieces in the lower treatment line.

Referring now to FIG. 1, there is shown a circuit-like conveying system 10 generally which includes a lower or treatment conveying line 12 generally, a lift or transfer mechanism 14 positioned at the end of the lower treatment line to retrieve work pieces therefrom. An upper or drying conveying line 16 is provided to receive treated work pieces from the lift or transfer mechanism 14. A second lift mechanism 18 is positioned at the end of the drying line 16 to retrieve dried work pieces therefrom and transfer those work pieces to a remote conveyor 20 (see FIG. 12). Untreated work pieces can be moved from the remote conveyor 20 to the entrance for the lower conveyor line 12. The work pieces are supported on a walking beam assembly 22 which is suspended from a hoist mechanism 24 which cooperates with a travel mechanism 26 that can be indexed forwardly one treatment station or backwardly one treatment station.

The walking beam assembly 22, the hoist mechanism 24 and the travel mechanism 26 are interconnected, interrelated and work together to transport, raise and lower work pieces. However, in the description herein the assembly 22 and mechanisms 24 and 26 may be described or referred individually.

Figure 2:
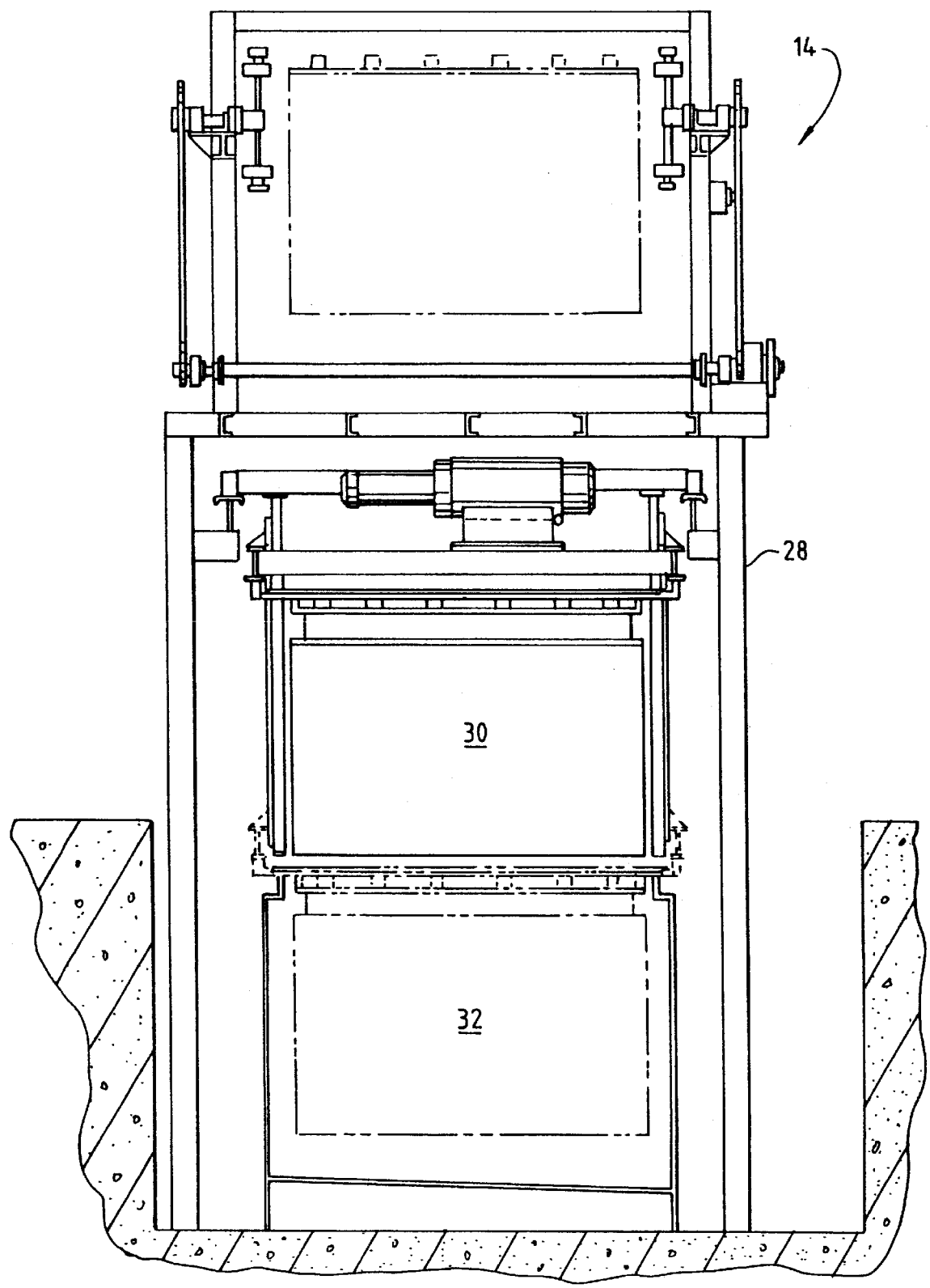
FIG. 2 is an end elevational view taken along line 2—2 of FIG. 1 showing the conveying apparatus frame, the upper and lower lines and a treatment tank positioned below the lower line.

The conveying system 10 includes a stationary support frame 28 which supports the lower conveying line 12, the upper conveying line 16, the hoist mechanism 24 and the travel mechanism 26. As seen in FIG. 2, a work piece such as 30 is positioned above the treatment tank 32 for lowering into the tank 32 and subsequent treatment. It will also be appreciated that the circuit-like conveying system 10 has depth or is three dimensional and accommodates aide work pieces such as 30. It is also seen that the frame 28 spans a treatment tank such as 32.

The operation of the walking beam assembly 22 with respect to the work pieces and the hoist and travel operation is best seen in FIGS. 3–11 inclusive. Referring to FIGS. 3, 5, 7, 10 and 11, the beam assembly 22 includes a pair of spaced rails 22A and 22B. Associated with each rail are L-shaped hanger engaging members such as 34. The beam assembly 22 is raised and lowered by a plurality of chains such as 36. A work piece hanger such as 38 is arranged to support a depending work piece 40 and to engage the hanger engaging member such as 34. As seen in FIG. 3 work pieces such as 40, 42 and 44 can be suspended from the beam assembly 22 over tanks such as 46, 48 and 50. Referring to FIG. 5, the beam assembly 22 is lowered and the work pieces 40, 42 and 44 are immersed in tanks 46, 48 and 50. The hangers such as 38 engage and rest on the side of the tanks and the hanger engaging members such as 34 are disengaged from the work pieces and can be moved to a position just below the hanger itself.

Then the beam 22 is no longer engaged with the hangers and can be moved rearwardly one station as suggested in FIG. 7. Then referring to FIG. 10, the beam 22 is raised and as it is raised it engages the hangers for work pieces 40, 42 and 44. But it will be noted that the rearward hanger engaging member is open (see FIG. 7) and can pick up a new work piece such as 52 in FIG. 10. Then the beam assembly 22 can be moved forwardly as in FIG. 11 thereby indexing the work pieces one station forwardly. It will be noted that each station is spaced the same distance from an adjacent station.

Referring now to FIG. 4, the hanger 38 supporting the work piece 40 and hanger engaging member bracket 34 are seen. In FIG. 6 the hanger 38 is lowered to rest on the edge of the tank such as 46 and the hanger engaging member 34 is shown in engagement with the hanger and the work piece 40 is shown there below. As seen in FIG. 8. the hanger engaging member 34 is positioned below and disengaged from the hanger 38 and is in position to be moved rearwardly with respect to the tank.

Referring to FIG. 9, the hanger 38 is shown as a square tube and the hanger engaging member 34 includes an angle iron 34A which is positioned to engage the hanger 38 and support the same. It is seen that based upon the movement of the beam 22 downwardly, rearwardly, upwardly and forwardly the work pieces are moved in a rectangular pattern so as to move the work piece from one tank to another.

Figure 12:
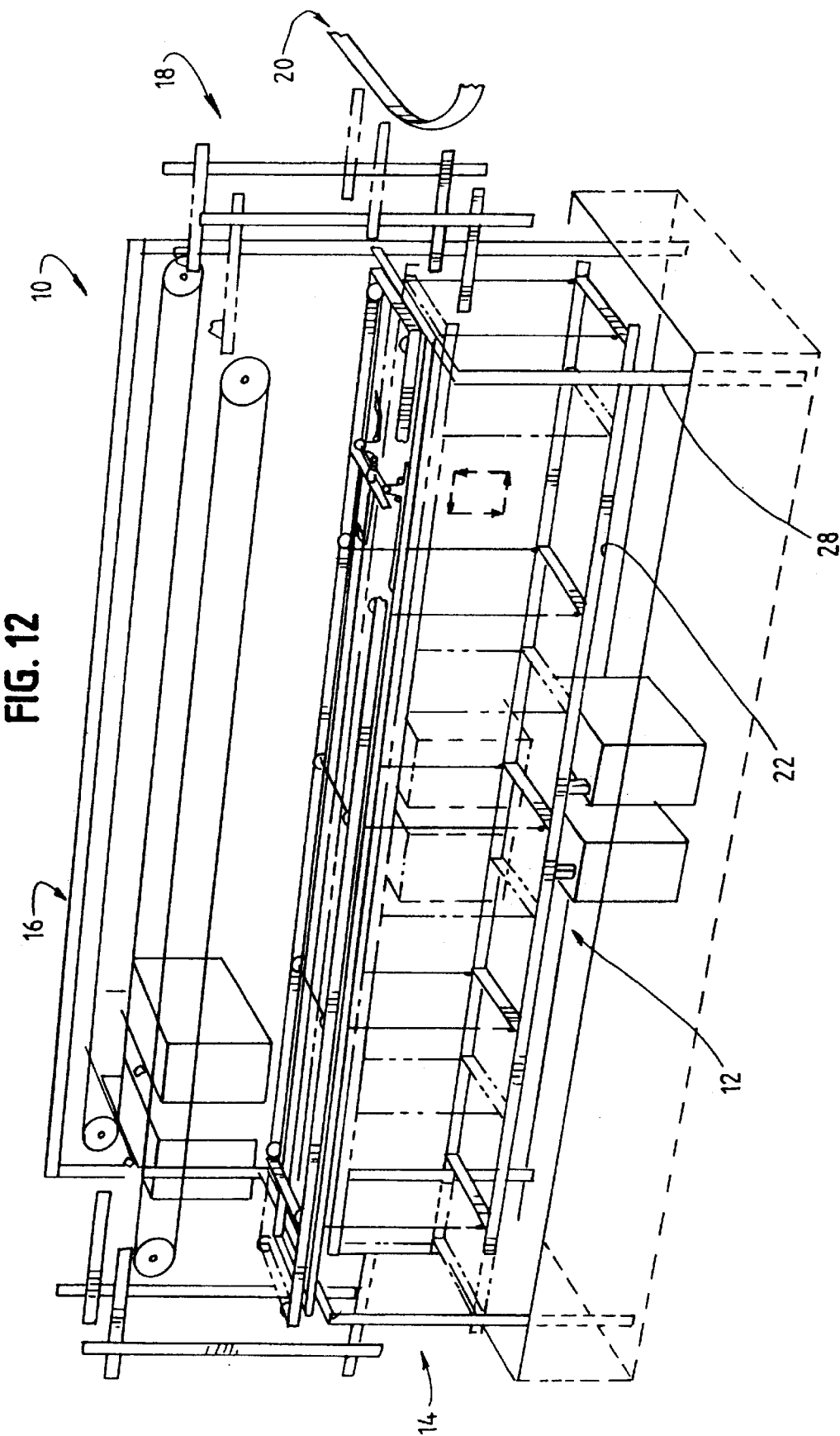
FIG. 12 is a perspective and diagrammatic view of a circuit-like conveying apparatus as in FIG. 1 and showing the travel and hoist mechanism for moving the support beam and lift mechanisms at the end of the conveyor lines.
Figure 16:
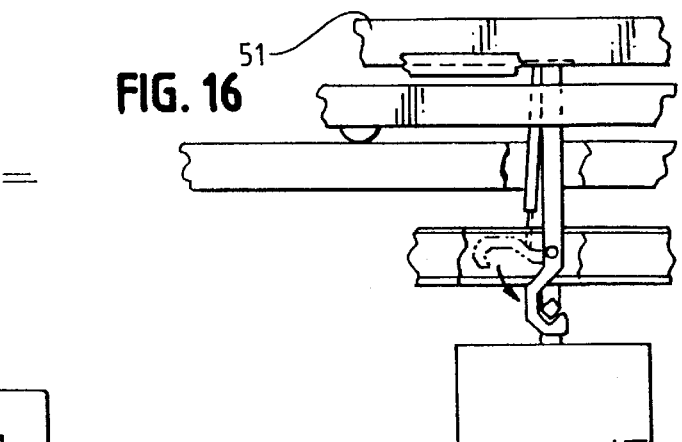
FIG. 16 is side elevational view showing the hook mechanism grasping a work piece.
Figure 14:
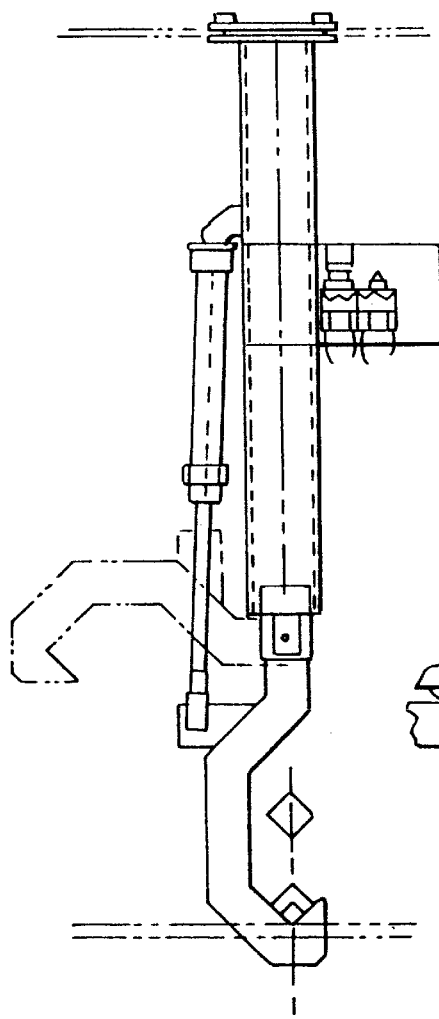
FIG. 14 is a side elevational view showing a piston-and-cylinder apparatus for operating the hook mechanism.

FIG. 12 shows the entire circuit-like conveying apparatus 10 in a diagrammatic fashion. There the remote conveyor 20 and the lift mechanism 18 are shown whereby an untreated work piece can be removed from the conveyor 20, delivered to the lower conveyor line 12 onto the beam assembly 22 so as to be moved to the treatment tanks, then moved to the end of the conveyor 12 where the transfer mechanism 14 can retrieve the work piece and move it upwardly to the drying or upper conveyor 16. The upper conveyor 16 is a chain-like conveyor line that is positioned within an oven so as to form a drying line. Due to the heat to which the chain is exposed, the chain may lengthen and a take-up or tightening mechanism is provided within the oven so as to adjust the chain.

Figure 17:
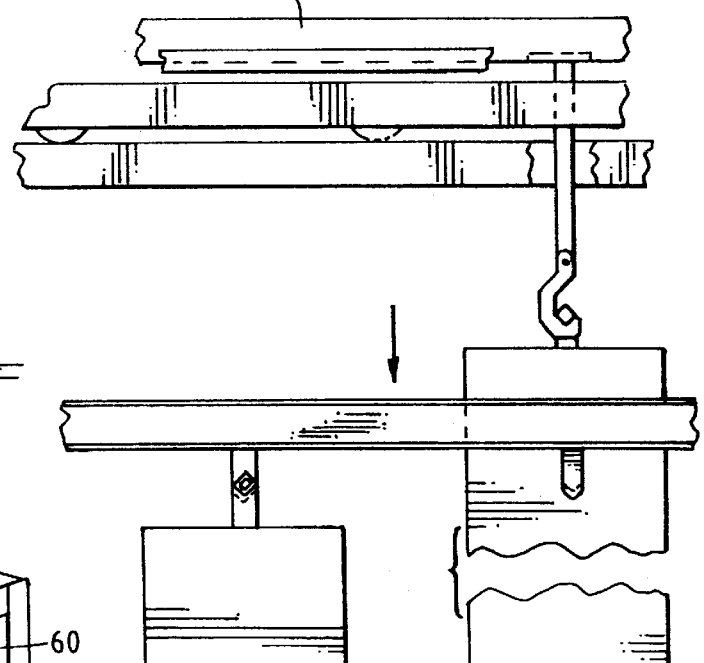
FIG. 17 is a side elevational view showing the hook mechanism in an operative position to restrain a first work piece and a second work piece in a lowered position.
Figure 15:
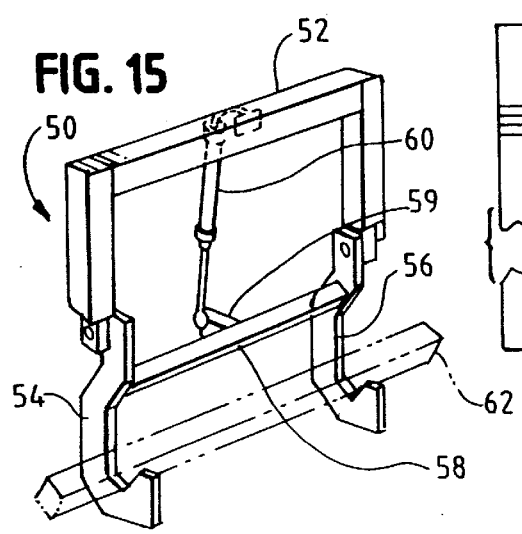
FIG. 15 is a perspective view showing the hook mechanism.

Sometimes, it is desirable to prevent a work piece from being immersed or dipped in a particular tank. A hook assembly 50 is provided that is secured to a stationary structure 51 secured to the frame 28 (See FIGS. 1 and 13–17). The hook assembly includes an inverted U-shaped frame 52 that is secured to the stationary structure 51, two hingedly connected depending hooks 54 and 56 and an actuator bar 58 with an outwardly extending arm 59 that connects the hooks 54 and 56 for joint movement. A pneumatic cylinder 60 is connected at one end to the frame section 52 and at the other end to the actuator bar 58 via the arm 59. By retracting the piston the bar is rotated and the hooks 54 and 56 raised to a nonengaging position By extending the piston rod the hooks are rotated to a position so that when the other work pieces are lowered the hooks engage a hangar such as 62 and prevent or restrain the associated work pieces from being lowered. When the beam is raised for movement, the hooks can be rotated to an inoperative position and the previously restrained work piece engages the appropriate support on the beam the work piece is moved to the next position and can be lowered and raised the other work pieces as seen in FIG. 17.

II. The Travel and Hoist Mechanisms and Beam Assembly

The interrelations and interconnections of the travel and hoist mechanisms 24 and 26 and the beam assembly 22 are seen in FIGS. 18–23 inclusive. For purposes of description these mechanisms and assemblies have been described separately.

Figure 19:
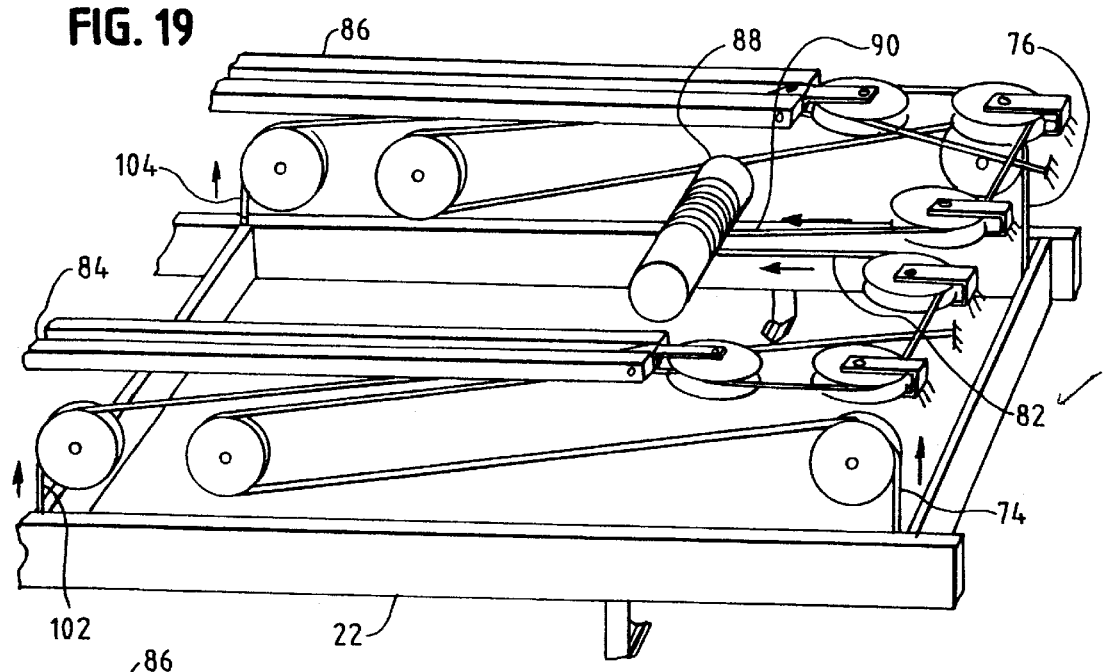
FIG. 19 is a diagrammatic and perspective view showing a pulley and cable system for operating the hoist mechanism and a chain system for raising and lowering the beam.
Figure 20:
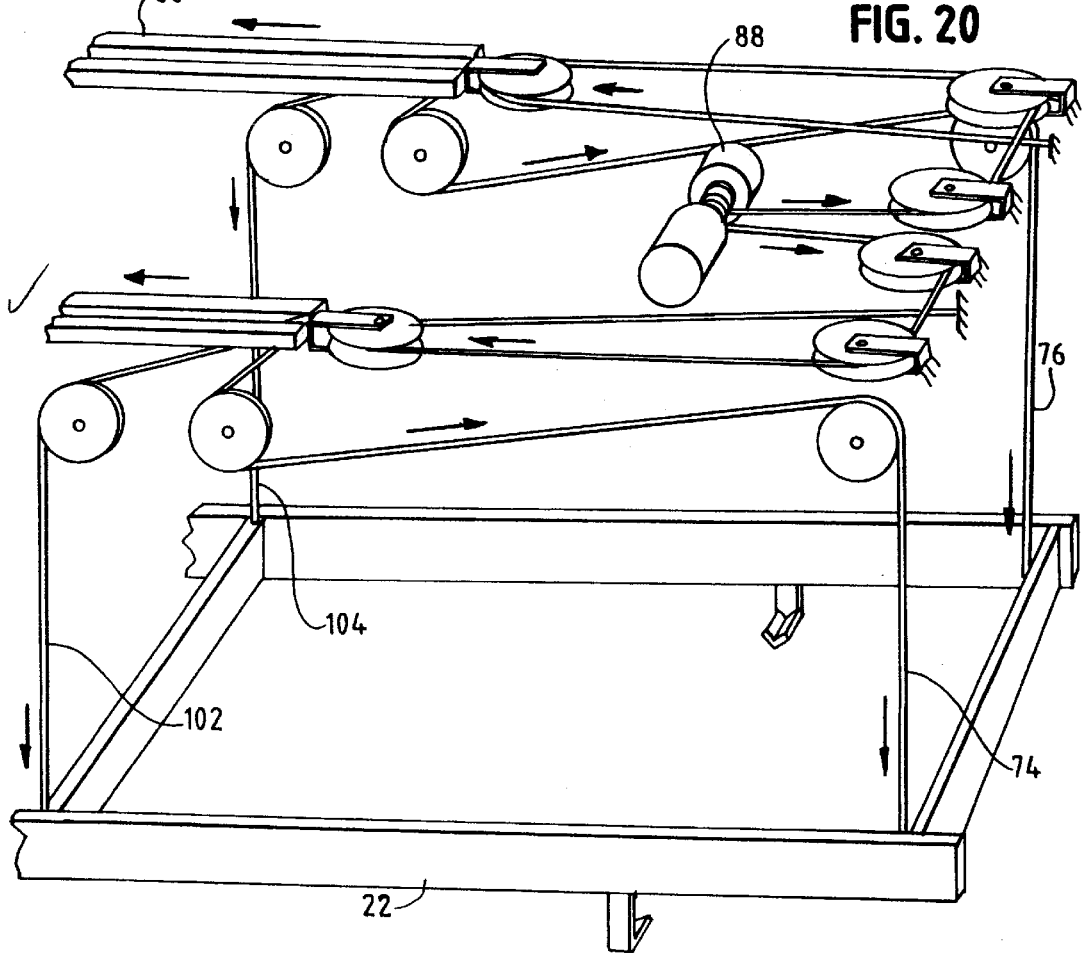
FIG. 20 is similar to FIG. 19 but with the hoist mechanism and beam in an extended position.
Figure 21:
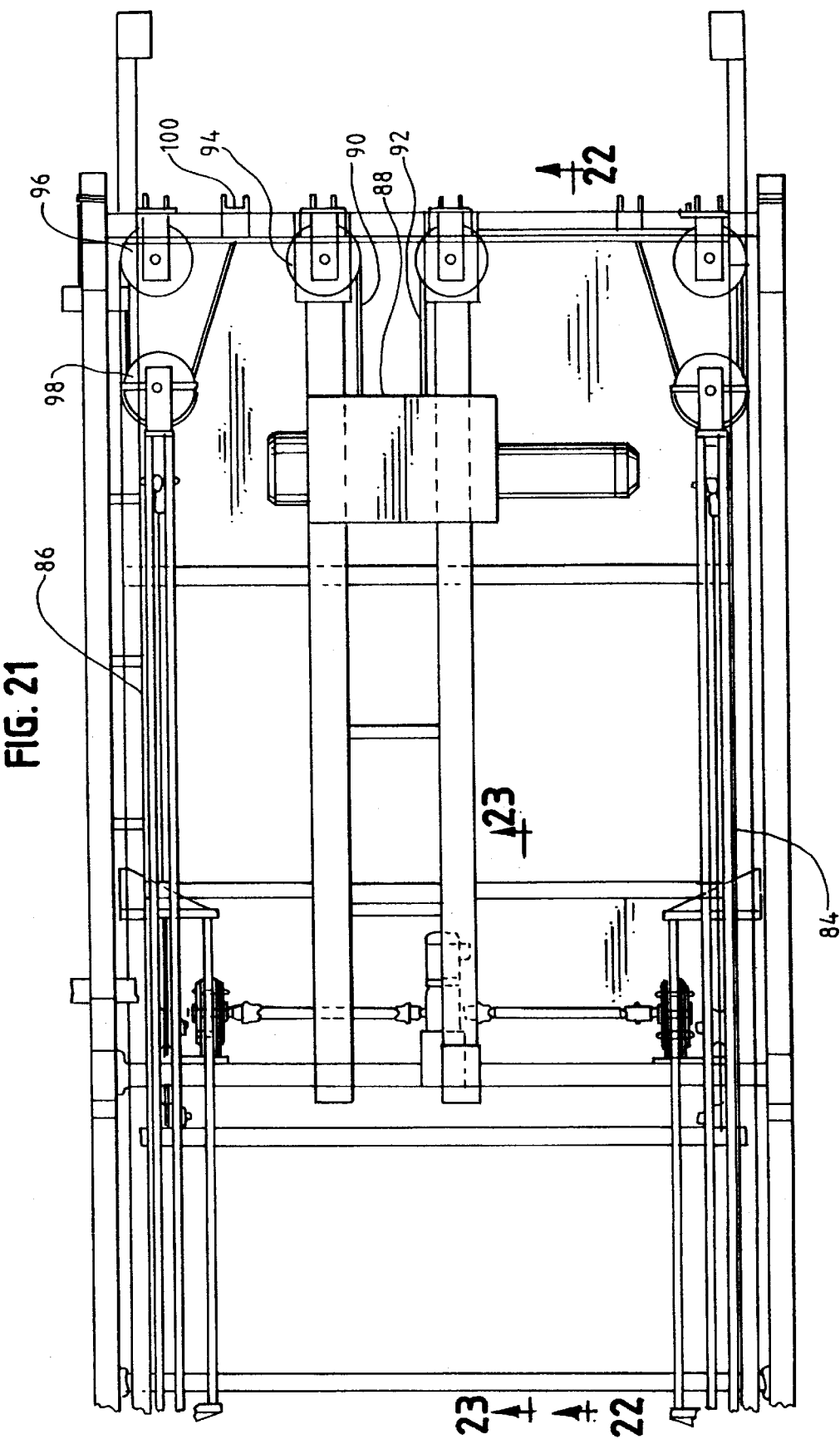
FIG. 21 is a plan view showing the travel and hoist mechanisms.

Referring first to FIG. 18 the stationary frame 28 includes an end section such as 70 and a pair of rails 72A and 72B. The travel mechanism 26 and hoist mechanism 24 are associated with the frame 28. The beam assembly 22 supports the various hangers from the hoist mechanism by a plurality of spaced chains such as 74 and 76 and the previously identified chain 36. The chains are spaced along the length of the beam so as to evenly raise and lower the beam. The chains are vertically orientated but trained about a plurality of vertically orientated sprockets such as 78 and 80 which are secured to the travel frame 82 and rotate about a horizontal axis. The chains such as 74 and 76 are trained about the sprockets and are secured at their end to the pull rods 84 and 86. The pull rods 84 and 86 are operated by a winch or spool 88 about which cables such as 90 and 92 are trained. A cable such as 90 passes through a set of pullies which permit it to retract the pull rods such as 86. Those pullies include the horizontally arranged pulley 94, the pulley 96 and the pulley 98. It will be noted that the end of the cable 90 is grounded or secured to the frame 82 at a point 100 similarly the pullies 94 and 96 are secured to brackets that are also grounded. As seen in FIGS. 19 and 20 by winding the cables 90 and 92 about the drum 88 the pull rods 84 and 86 are retracted and thus draw the frame assembly 22 upwardly through the action of the chains 74 and 76 and other chains which are connected to the pull rod and the assembly such as 102 and 104. The frame 22 is shown in a lower position in FIG. 20 in which the drum 88 is reversed and the weight of the frame 22 tends to pull the frame downwardly and coacts with the pull rods 84 and 86 and chains 74, 76, 102 and 104. The spool 88, cables 90, 92, rollers 94, 96, 98 and grounding position 100 can also be seen in FIG. 21.

Figure 22:
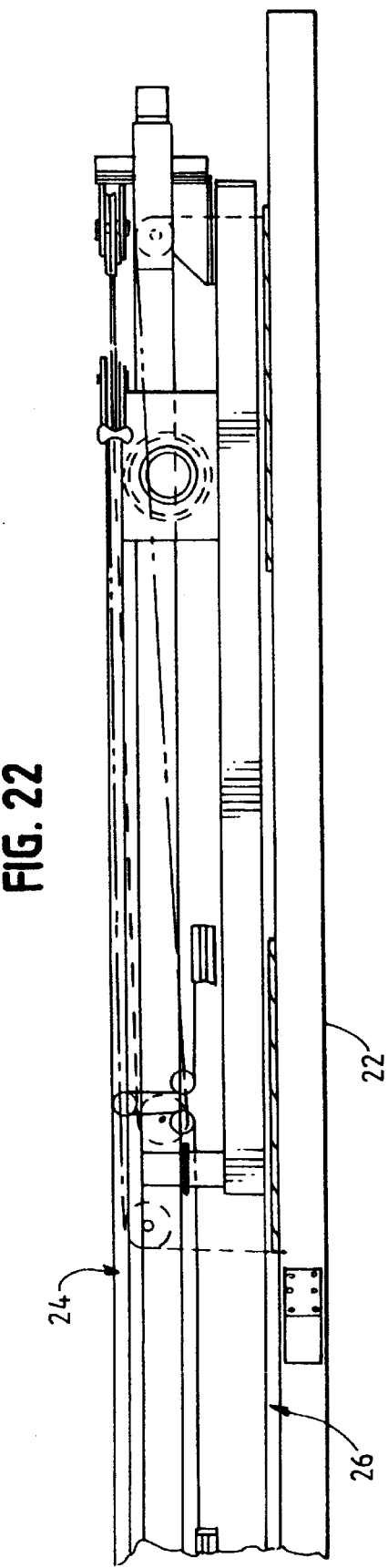
FIG. 22 is an elevational view showing the travel and hoist mechanisms connected to the beam and taken along line 22—22 of FIG. 21.
Figure 23:
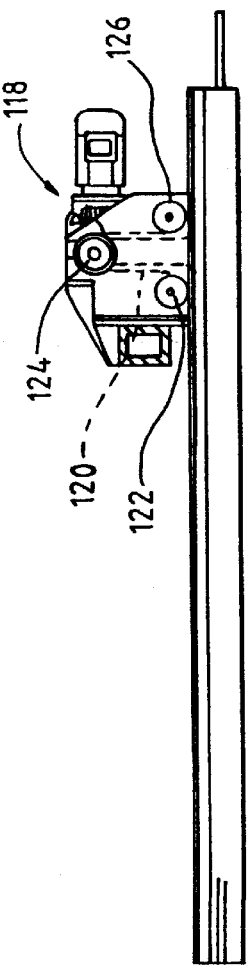
FIG. 23 is a side elevational view of a traveler mechanism and taken generally along lines 23—23 of FIG. 21.
Figure 28:
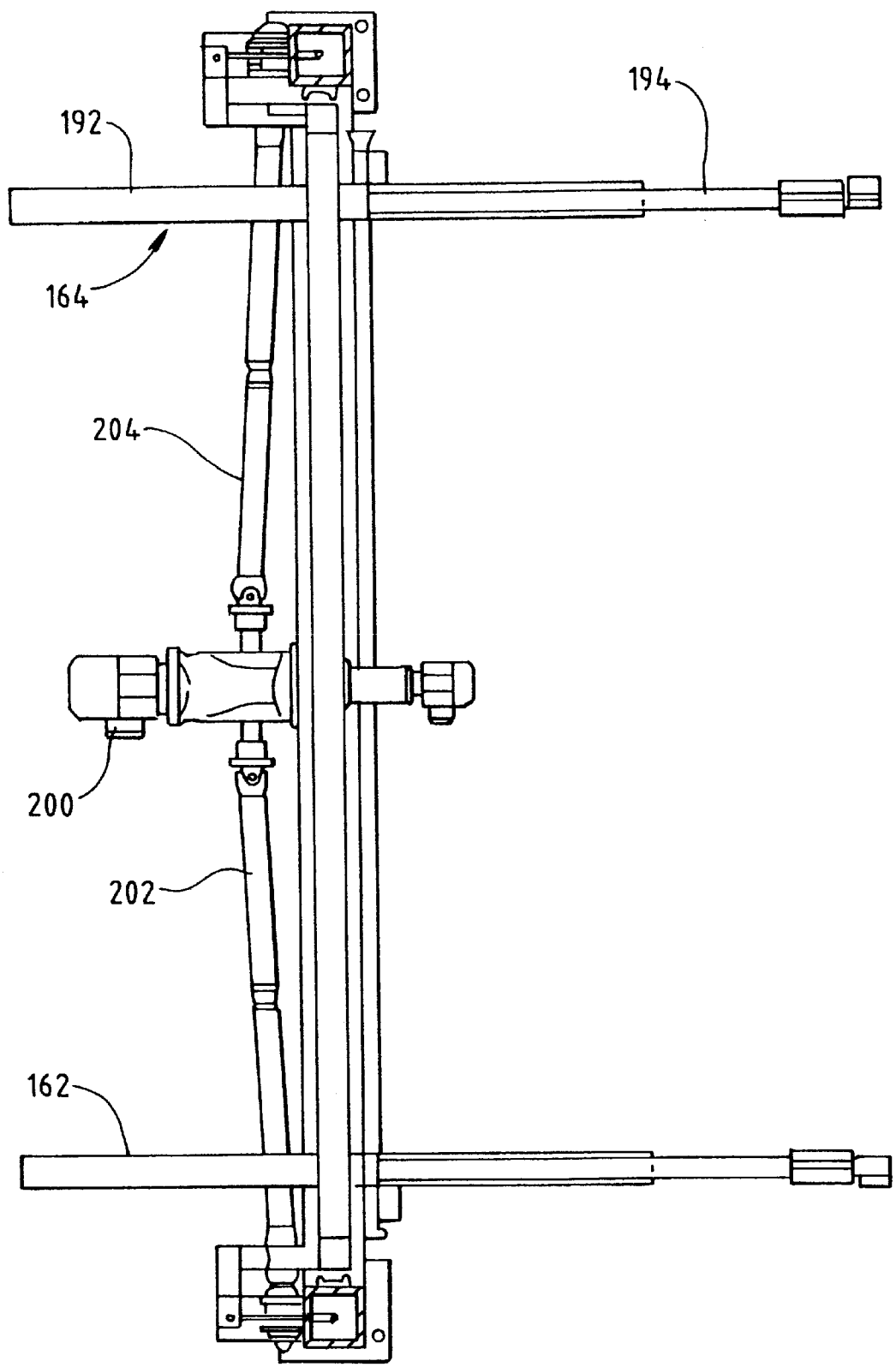
FIG. 28 is a plan-style view taken along line 28—28 of FIG. 27.

Referring to FIG. 22 the hoist mechanism 24, the travel mechanism 26 and the beam assembly 22 is seen in elevational view and the beam assembly 22 is in the upper position. As indicated above the entire beam assembly 22 and take up apparatus can be indexed one station forwardly or one station rearwardly so as to remove the work pieces from a first tank, raise them and move them to a second tank and then lower them Referring to FIG. 18, horizontal movement of the beam assembly 22 is controlled by the travel motor 110, drive shafts such as 112, stops 114 and 116, and the traveler or drive mechanism 118 generally (which is also seen in FIG. 23). Fundamentally the traveler 118 moves back and forth between the stops 114 and 116 alone the chain 120. It is seen that with the respect to the traveler movement the chain 120 is trained about an idler sprocket 122, a driven sprocket 124 and another idler sprocket 126. Thus the motor 110 rotates the drive shaft 112 which causes the sprocket 124 to rotate. The chain 120 is drawn beneath the idler sprocket 122 over the drive sprocket 124 and beneath the idler sprocket 126 to cause the traveler mechanism 118 to move toward one of the stops 114 or 116. It will be appreciated that when the traveler mechanism moves the hoist mechanisms 24 similarly moves and so does the walking beam assembly 22. The mechanism is then reversed and the walking beam is moved to the other end at stop 114. At that point the beam 22 may be raised so as to lift the appropriate hangers and thus the work pieces have been indexed or moved one station forwardly.

III. The Transfer or Lift Mechanism

The transfer or lift mechanism can be seen in FIGS. 24–28 inclusive. However, reference is made to FIG. 12 where the lift mechanisms 14 and 18 are shown at either end of the conveyor whereby work pieces can be lied by a lift mechanism 14 from the end of the lower line 12 to the line 16. Other lift mechanisms can move dried work pieces from the upper line 16 to the remote conveyor 20 and from the remote conveyor 20 untreated pieces can be removed and delivered to the lower conveyor 12.

Referring now to FIG. 24, a lift mechanism 150 generally is shown. The lift includes a pair of side posts 152 and 154 which together with cross members 156 and 158 define a frame.

Within the frame there is provided a carrier 160 generally which can be moved vertically upwardly or downwardly In the larger framed. A pair of arm assemblies 162 and 164 are secured to the carrier and can move inwardly or outwardly and from one side to the other side of the carrier 160.

The carrier 160 includes an upper cross member 166 and a lower cross member 168. A pair of vertical members 170 and 172 connect the cross members 166 and 168 and cooperate the posts 152 and 154 which have rails therein.

The carrier 160 is raised or lowered by a driven chain and counter weight mechanism. The drive motor 174 is connected via a shaft such as 176 to chain drive sprockets 178 and 180 on the opposite sides of the lift. At the top of the lift mechanism idler sprockets 182 and 184 are provided. Drive chains 186 and 188 are trained about the drive sprockets such as 178 and 180. The chain such as 186 is connected to the carrier 160 by a bar such as 189. The chain 186 Is also connected to the counter weight 190 but on the opposite side of the chain. Thus the motor 174 can drive the chain so that the counter weight 190 moves upwardly, and the carrier 160 via bar 189 descends. If the motor 174 is reversed the counter weight 190 is moved downwardly and the carrier 160 is moved upwardly. Each of the arms 162 and 164 are secured to one of the rail-like members 170 and 172 at a position spaced from the top cross member 166 by brackets 171 and 173. Each of the arms includes a stationary section such as 192 and a telescoping section such as 194. The telescoping section rides on a I-beam like rail 196 as seen in FIG. 26. On each telescoping section such as 194 a hanger supporting saddle such as 198 or 199 is mounted. The carrier motor 200 and carrier drive shafts 202 and 204 cause the carrier chains 210 and 212 to rotate to cause the telescoping sections of the arms to move inwardly or outwardly as seen in FIG. 24. It will be noted that the carrier cross member 166 is spaced above the connection of the arm to the carrier so as to permit the saddle 198 to move thereunder. Moreover, the entire carrier is sized so as to permit clearance of a work piece suspended from saddles such as 198 and 199. The carrier chain 212 is connected to the telescoping section 194 by a pinion 213 and rack 214 which cooperate to cause the arm to move laterally inwardly and outwardly.

The saddle 198 is connected to one end of the telescoping section cable 216. The cable 216 is trained about the idler 218 and secured to the telescoping section at an end 220. The saddle 198 is also connected to a second telescoping section cable 222 which is trained about a idler 224 and connected to the telescoping section at end 226. Thus as the arm moves from one side of the carrier to the other side of the carrier it will be seen that the saddle will move relative to the telescoping section 194 and from one side of the carrier to the other side of the carrier 160. This is seen in FIG. 27 where the stationary arm 192 and the telescoping arm 194 are shown. In this situation a saddle such as 198 is shown supporting a hanger such as 226 and work piece such as 228. It will be appreciated that the telescoping section 194 of the arm as well as the hanger 226 and work piece 228 is moved from one side of the post 152 and carrier 160 to the other side (i.e. left to right or vise versa). It is seen that in FIG. 27 the arm can be moved to a lower position or raised to an upper position and the saddle 198, hanger 226 and work piece 228 can move accordingly.

IV. Operation

In operation an untreated work piece is delivered on a remote conveyor 20 so that a lift mechanism such as 18 can position a telescoping section such as 194 and hanger receiving saddles such as 198 and 199 under the hanger for the work piece and thus remove the work piece from the remote conveyor. The hanger rests on the saddles and the section is retracted under the action of the drive motor 200. The telescoping sections of the arms are moved to the other side of the lift and in position to be delivered to the treatment conveyor line such as 12. There the hanger and work piece are deposited on the hanger engaging bracket such as 34 associated with the beam 22 and the untreated pieces are added to the conveyor and moved as shown in FIGS. 3, 5, 7, 10 and 11. The hoist and travel mechanisms 24 and 26 cause the untreated piece to move into and out of the various treatment tanks and to the exit end of the lower line. At the exit end of the lower line 26 a lift mechanism 14 is provided and arms on the lift mechanism are extended and engage the hanger on the appropriate saddles. The arm is then retracted and lifted to the second line such as 16. There the arms extend and the hanger is deposited on the line 16. The treated piece is moved along the second or drying line to its exit end. There the lift mechanism 18 extends the arms and engages the hanger using the saddles. The arms are retracted, moved to a lower position, and caused to move to the other side of the lift mechanism and the hanger and work piece are deposited on the remote conveyor 20. The cycle is then repeated. It will be appreciated the appropriate controls are provided for the operation of the system Numerous changes can be made to the embodiment disclosed herein without departing from the spirit and scope of this invention.

What is claimed is:

1. A conveyor apparatus for the simultaneous and discontinuous movement of a plurality of work pieces to and between a plurality of treatment stations, said apparatus including:
   an elongated and stationary structural frame having an entrance end and an exit end;
   a plurality of treatment stations positioned along the length of the frame and in spaced relation thereto;
   a travel mechanism carried on the frame and moveable relative to the frame between adjacent treatment stations;
   a hoist mechanism carried on the travel mechanism and having retractable and extendable members, and
   an elongated beam which extends along the frame, which is connected to the hoist mechanism by the retractable and extendable members and which is constructed for movement between a lower position and an upper position and to releasably support each of a plurality of work pieces;
   so that the beam can be lowered for the work pieces to be treated moved one station towards the entrance end, raised and moved one station toward the exit end so as to move the work pieces forwardly one station.

2. An apparatus as in claim 1 wherein a hook assembly is mounted to the structural frame for engaging a work piece and to prevent the work piece from being lowered with other work pieces on the beam, said hook assembly including a bracket mounted to the frame, a pair of hook members hingedly mounted to the bracket and an actuator for moving the hook members between a grasping position and a non-grasping position.

3. An apparatus as in claim 1 wherein said structural frame includes spaced stop members for limiting movement of the travel mechanism, and said travel mechanism includes a drive assembly for causing the travel mechanism to move between the stop members.

4. An apparatus as in claim 3 wherein the drive assembly includes a traveler mechanism which includes a chain which extends between stop members, a drive sprocket for engaging the chain, a drive motor for rotating the drive sprocket and causing the travel mechanism to move along the chain between stop members.

5. An apparatus as in claim 1 wherein the retractable and extendable members include a pair of elongated pull rods each extending along the frame, spaced and substantially parallel to each other, a spool member secured to the travel mechanism, and a pulley and cable system connected to the spool member and to each of the pull rods so that winding of the cable about the spool causes the pull rods to move in one direction and unwinding permits the pull rods to move in the opposite direction.

6. An apparatus as in claim 5 wherein a plurality of sprockets are mounted to the travel mechanism, and a plurality of support chains are provided, each connected at one end to the elongated beam and at the other end to a pull rod and each trained about a sprocket so that the beam is raised or lowered by movement of the pulls rods.

7. An apparatus as in claim 1 wherein each beam includes work piece hangers or grasping elements for supporting a work piece and for releasing a work piece for treatment.

8. A circuit-like conveyor system which includes:

a lower conveyor line having an entrance and an exit end;

a first lift mechanism positioned adjacent the exit end of the lower line;

an upper conveyor line spaced from the lower line and having an entrance end and an exit end, with the first lift mechanism positioned adjacent the entrance end of the upper conveyor line;

a second lift mechanism positioned adjacent the exit end of the upper line and the entrance end of the lower line;

and constructed for the simultaneous and discontinuous movement of a plurality of work pieces to and between a plurality of treatment stations:

an elongated and stationary frame;

said plurality of treatment stations positioned in spaced relation to the frame, and said lower conveyor line;

a travel mechanism carried on the frame and movable relative to the frame between adjacent treatment stations; a hoist mechanism carried on the travel mechanism and having retractable and extendable supports;

an elongated beam which extends along the frame and which is connected to the hoist mechanism by the retractable and extendable supports and which is constructed for movement between a lower position and an upper position and to releasably engage each of a plurality of work pieces; and which is constructed for movement toward the entrance end or toward the exit end of the lower conveyor so that the beam can be lowered and work pieces delivered to the treatment stations; moved one station toward the entrance end of the lower conveyor, raised, and moved one station toward the exit end so as to move the work pieces forwardly one station; and wherein each of the lift mechanisms is constructed to retrieve a work piece on a hanger from a first position and transport the work piece to a second vertically different position, and each mechanism includes:

a substantially vertical frame-like structure;

a carrier assembly mounted in the frame-like structure for movement upwardly and downwardly and includes a pair of generally horizontally positioned arm assemblies mounted to the carrier, each of said arms including a section which is horizontally extendable and retractable for movement toward and away from the carrier assembly; and a work piece receiving structure mounted to the extendable and retractable portion of each arm for movement with the arm to a position toward the end thereof when the arm is extended from the carrier.

* * * * *